United States Patent
Yoon et al.

(12)

(10) Patent No.: US 6,482,547 B1
(45) Date of Patent: *Nov. 19, 2002

(54) NEGATIVE ACTIVE MATERIAL FOR LITHIUM SECONDARY BATTERY AND LITHIUM SECONDARY BATTERY USING THE SAME

(75) Inventors: Sang-young Yoon, Choongcheongnam-do (KR); Jeong-ju Cho, Choongcheongnam-do (KR); Jae-yul Ryu, Choongcheongnam-do (KR); Kyou-yoon Sheem, Choongcheongnam-do (KR); Wan-uk Choi, Choongcheongnam-do (KR); Sang-jin Kim, Choongcheongnam-do (KR)

(73) Assignee: Samsung Display Devices Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/316,766

(22) Filed: May 21, 1999

(30) Foreign Application Priority Data

| May 21, 1998 | (KR) | 98-18312 |
| Sep. 8, 1998 | (KR) | 98-37047 |
| Sep. 8, 1998 | (KR) | 98-37048 |
| May 8, 1999 | (KR) | 99-16441 |

(51) Int. Cl.$^7$ ............................... H01M 4/58
(52) U.S. Cl. ...................... 429/231.8; 429/231.95; 429/218.1; 429/326; 429/331; 429/332; 429/338

(58) Field of Search ................. 429/231.95, 231.8, 429/326, 331, 332, 338, 218.1

(56) References Cited

U.S. PATENT DOCUMENTS

| 5,344,726 A | * | 9/1994 | Tanaka et al. | 429/209 |
| 5,965,296 A | * | 10/1999 | Nishimura et al. | 429/231.8 |
| 6,027,833 A | * | 2/2000 | Ueda et al. | 429/218.1 |
| 6,040,092 A | * | 3/2000 | Yamada et al. | 429/331 |

OTHER PUBLICATIONS

B.D. Cullity, Elements of X–Ray Diffraction, 2nd Ed., pp. 126 and 401, 1978.*

* cited by examiner

*Primary Examiner*—Patrick Ryan
*Assistant Examiner*—Angela J Martin
(74) *Attorney, Agent, or Firm*—Blakely Sokoloff Taylor & Zafman

(57) ABSTRACT

A negative active material for a lithium secondary battery which is capable of improving packing density and has good high-rate charge/discharge and cycle life characteristics is provided. The negative active material includes a crystalline carbon core and an amorphous carbon shell. Alternatively, the negative active material includes secondary particles prepared by gathering at least one crystalline carbon primary particle. A surface of the secondary particles is coated with an amorphous carbon and the secondary particles has a substantially spherical form. The negative active material has two exothermic peak of the differential thermal analysis at 1000° C. or less. A lithium secondary battery using the negative active material can use propylene carbonate for an organic solvent of an electrolyte.

21 Claims, 4 Drawing Sheets

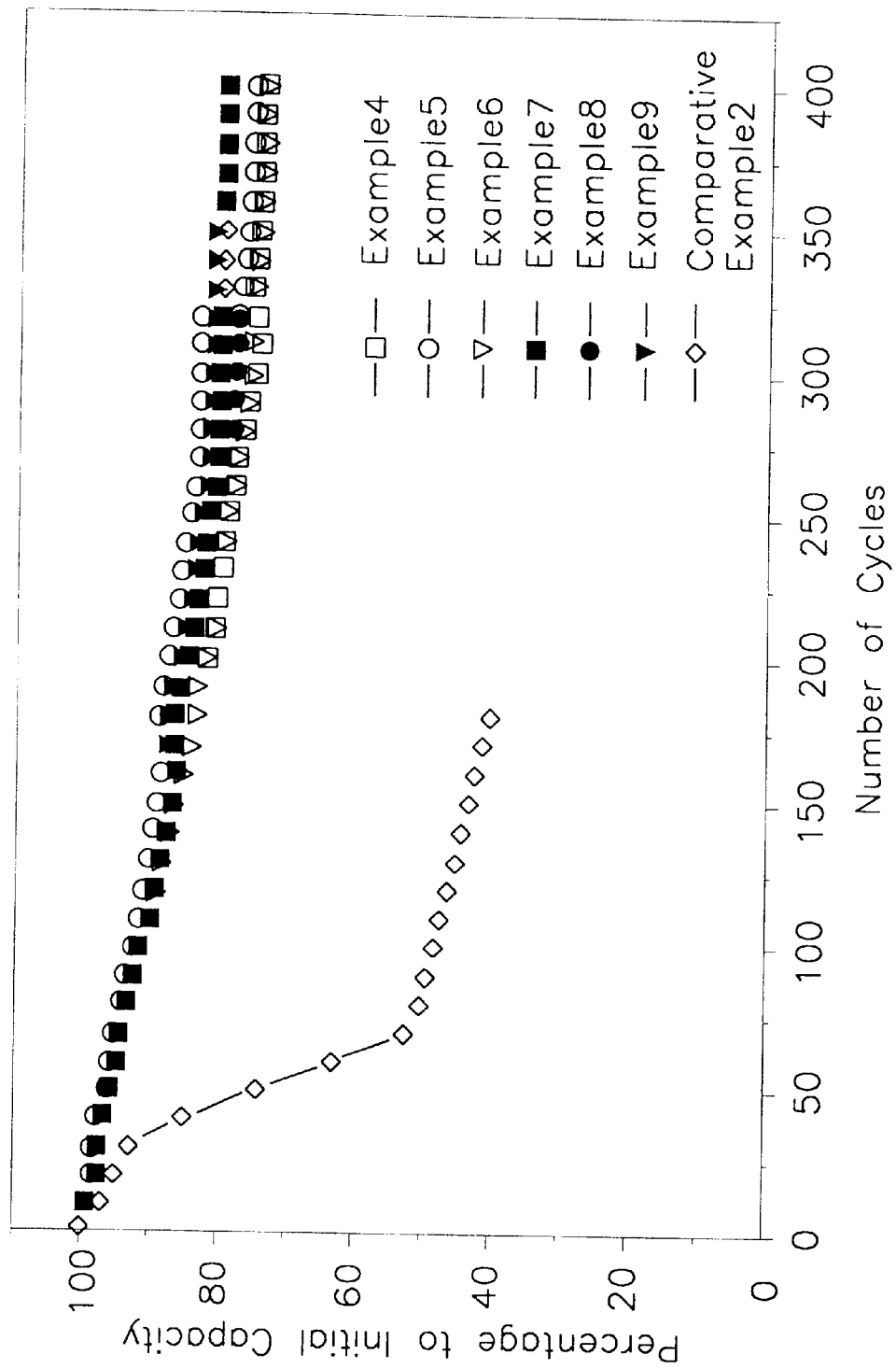

NEGATIVE ACTIVE MATERIAL FOR LITHIUM SECONDARY BATTERY AND LITHIUM SECONDARY BATTERY USING THE SAME

CROSS REFERENCE TO RELATED APPLICATION

This application is based on applications Nos. 98-18312, 98-37047, 98-37048 and 99-16441 filed in the Korean Industrial Property Office on May 21, 1998, Sep. 8, 1998, Sep. 8, 1998 and May 8, 1999, respectively the content of which is incorporated hereinto by reference.

BACKGROUND OF THE INVENTION (a) Field of the Invention

The present invention relates to a negative active material for a lithium secondary battery and a lithium secondary battery by using the same and, more particularly, to a negative active material which can improve charge density of the electrode and has good high-rate charge-discharge characteristics and cycle life characteristic.

(b) Description of the Related Art

As a negative active material in a lithium secondary battery, particularly, a lithium ion battery or a lithium ion polymer battery, carbonaceous materials are generally used. There are two basic types of the carbonaceous material: crystalline graphite and amorphous carbon. Crystalline graphite includes nature graphite and artificial graphite obtained by sintering pitch at 2000° C. Amorphous carbon has a low graphitization degree or diffraction line in X-ray diffraction. Amorphous carbon includes a soft carbon obtained by coal pitch or oil pitch and a hard carbon obtained by a polymer resin such as phenol resin.

Crystalline graphite offers the advantages of exceptional voltage flatness and high charge/discharge efficiency, but a charge/discharge decreases as a result of side reactions if many of the edges of the hexagonal crystalline graphite are exposed to electrolyte. With regard to amorphous carbon, although this material displays a high discharge capacity, it has a high irreversible capacity, low charge/discharge efficiency, and does not display a high level of voltage flatness.

Therefore, crystalline graphite is generally used for the negative active material in the lithium secondary battery. For using crystalline graphite such as nature graphite or artificial graphite in the battery, pulverizing and sieving steps must be performed. In the steps, non-uniform or disk-shaped carbonaceous active material is inevitably produced due to the high crystallinity of crystalline carbon. When produced non-uniform or disk-shaped of the active material is used in an electrode plate, it is to produce a negative electrode having a low tap density. Furthermore, when the active material is coated on the electrode plate and pressed, a basal plane of the active material is only exposed to an electrolyte by orienting non-uniform active material particles. The basal plane has lithium ion absorption and desorption problems, thereby deteriorating high-rate charge/discharge characteristics. Furthermore, the expansion and shrinkage rates of volume the produced electrode increases, lowering cycle life characteristic. Furthermore, graphene sheet is developed in edge of crystalline graphite and the side reaction of graphite and an electrolyte is activated so that it is difficult to use crystalline graphite for a lithium secondary battery requiring high initial efficiency (Journal of Electrochemical Society 137 (1990) 2009). More particularly, if an electrolyte including propylene carbonate is used in a lithium secondary battery including crystalline graphite, the crystalline graphite layer is separated from the electrode because of the co-intercalation of the electrolyte. Due to the reason, lithium ion is difficult to move back and forth of the electrode, decreasing initial efficiency of the active material and capacity of the battery.

There have been attempts at producing carbonaceous material using both crystalline graphite and amorphous carbon together to obtain the advantages of both these materials.

U.S. Pat. No. 5,344,726 discloses a carbon anode for secondary battery prepared by coating amorphous carbon on the surface of high crystalline graphite. The method can controls decomposition of an electrolyte and increases initial charge-discharge efficiency. However, because the carbon anode of the method has a very thin amorphous carbon layer, non-uniform or disk-shaped form of the crystalline graphite do not changed into a spherical form which enables to increase a packing density. Furthermore, in pressing the electrode, the high crystalline graphite core is still totally oriented, lowering high-rate charge-discharge and cycle life characteristics.

U.S. Pat. No. 5,401,598 discloses an electrode including a carbon active material of multi-phasic structure. The multi-phasic structure carbon active material is prepared by adding graphite powder to a mixed solution of pitch and toluene and heating the mixture to obtain a carbonaceous material including graphite core and a pitch surface. The carbonaceous material is formed and carbonized to prepare the carbon active material having multi-phasic structure. The active material has excess of amorphous carbon, at least 35 volume percent. Due to the excess of amorphous carbon, voltage flatness is poor. Furthermore, because the method includes a pulverizing step after carbonizing step, a surface of amorphous carbon may be exposed to an electrolyte. Subsequently, the effect of coating amorphous carbon on crystalline graphite is not shown and initial charge-discharge efficiency decreases as a result of side reactions of graphite and the electrolyte.

Furthermore, a method of adding a conductivity agent to an active material, a method for manufacturing multi-electrode plate by using a metal which can form a metal thin layer with high conductivity and method of mixing at least two type of active materials are attempt to increase charge density, high-rate charge-discharge and cycle life characteristics. However, the effect is not satisfactory.

SUMMARY OF THE INVENTION

It is an object of the present invention to provide a negative active material for a lithium secondary battery which can improve packing density without deteriorating electrochemical characteristics such as high-rate charge-discharge characteristics.

It is another object to provide the negative active material having good voltage flatness, initial charge-discharge efficiency, high-rage charge-discharge efficiency and cycle life characteristics.

It is another object to provide a lithium secondary battery using the negative active material.

It is another object to provide the lithium secondary battery having high capacity and efficiency, and good cycle life characteristics without the limitation of the electrolyte type.

These and other objects may be achieved by a negative active material for a lithium secondary battery including a crystalline carbon core and an amorphous carbon shell formed on the core.

In order to achieve these objects and others, the present invention provides a negative active material for a lithium secondary battery comprising secondary particles having a substantially spherical form. The secondary particles is prepared by gathering at least one crystalline carbon primary particle and has an amorphous carbon surface.

The present invention further includes a lithium secondary battery. The lithium secondary battery includes a positive electrode including an positive active material, a negative electrode including an active material having at least two exothermic peaks, a separator interposed between the positive and the negative electrodes, and an electrolyte. The negative active material includes a crystalline carbon and an amorphous carbon. The electrolyte is immersed in the positive and negative electrodes and the separator, and comprises an organic solvent and a lithium salt.

The organic solvent may be at least 51 volume percent of cyclic carbonate and linear carbonate. Alternatively, the organic solvent may be a first solvent of ethylene carbonate, dimethy carbonate and propylene carbonate; a second solvent of ethylene carbonate, dimethyl carbonate, diethyl carbonate and propylene carbonate; and a third solvent of ethylene carbonate, diethyl carbonate and propyl acetate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein:

FIG. 5 is a graph showing cycle life characteristics of example and comparative example of the present invention.

DETAILED DESCRIPTION OF THE INVENTION

A negative active material for a lithium secondary battery of the present invention includes both a crystalline carbon and an amorphous carbon and has at least two exothermic peaks at 1000° C. or less in differential thermal analysis. The negative active material may be classified into one active material made of mono particles and another active material made of with multiple particles.

1. The active material made with mono particles

The negative active material of the present invention includes a crystalline carbon core and an amorphous carbon shell formed on the core. The exemplary of a method of preparing the above active material is a coating method such as a solution coating method, a mechanical coating method, or immersing method. These methods are as follows:

1) Coating method

An amorphous carbon precursor is dissolved in an organic solvent and a crystalline carbon is added to the amorphous carbon precursor solution. As a result, the surface of the crystalline carbon is coated with the amorphous carbon. The resulting mixture is refluxed and filtered. The filtered powder is heat-treated at about 1000° C. The crystalline carbon may be crystalline graphite without activation. The activation step is performed by refluxing the crystalline graphite in strong acid such as sulfuric acid.

The diameter of the negative active material obtained by the above method is preferably 5–100 $\mu$m, more preferably, 10–65 $\mu$m. If the diameter exceed 100 $\mu$m, it can not be obtained the desirable electrode packing density. On the contrary, the diameter is less than 5 $\mu$m, the unwanted side reaction between the negative active material and the electrolyte may occur. Furthermore, the specific surface area of the negative active material is preferably 0.5–6 $m^2/g$. If the specific surface area exceeds 6 $m^2/g$, the unwanted side reaction may occur. On the contrary, the specific surface area is less than 0.5 $m^2/g$, the area where the electrolyte is contacted is small and it is difficult to perform charge-discharge reaction.

2) Immersion method

An amorphous carbon precursor is dissolved in an organic solvent and crystalline carbon particles are added to and immersed in the amorphous carbon solution. Thereafter, the crystalline carbon particles immersed with the amorphous carbon were extracted from the solution. The resulting crystalline carbon particles was carbonized to produce a negative active material.

2. A negative active material made of multiple particles

Figure 1:
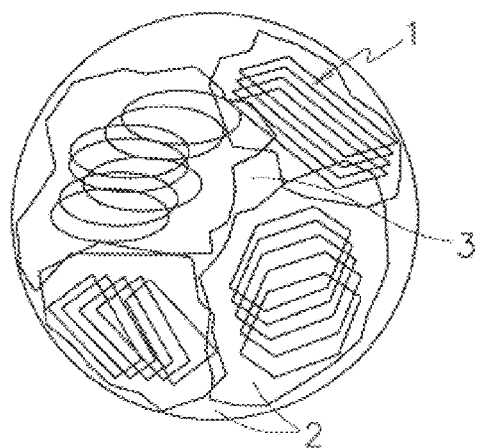
FIG. 1 is a cross sectional view showing a structure of a negative active material according to one embodiment of the present invention.

FIG. 1 shows the structure of the negative active material made of multiple particles. As shown in FIG. 1, at least one crystalline single particle 1 is gathered to form a mass and the gathered mass is coated with an amorphous carbon, 2 to have substantially spherical form. In the application, the single particles are called "primary particles" and the gathered mass is called a "secondary particle". The crystalline primary particles 1 are gathered with a binder such as an amorphous carbon 2. A microporous channel 3 is generated between the primary particles.

A method of preparing the above structure is as follows:

An amorphous carbon precursor is added to a solvent to prepare an amorphous carbon precursor solution. The state of the amorphous carbon precursor in the resulting solution is dissolution, melting, softening or distribution. The solvent may be an organic solvent or inorganic solvent. The exemplary thereof includes toluene, tetrahydrofuran, benzene, methanol, ethanol, hexane, cyclohexane or water. It is also possible to use a mixture thereof.

The amorphous carbon precursor may be coal pitch, petroleum pitch, coal-based oil, petroleum-based heavy oil or a polymer resin such as phenol resin, furan resin, polyimide resin, polyvinylalcohol resin, cellulose resin, epoxy resin or polystyrene resin. Preferably, coal pitch or petroleum pitch is used to have a high capacity and a low irreversible capacity. It is more preferably used that an organic solvent soluble pitch is prepared by dissolving coal pitch or petroleum pitch and removing organic solvent insoluble components.

At least one crystalline carbon particle is coat-gathered with the amorphous carbon precursor. At this time, at approximately the same time the coat-gathering step, spherical-making step occurs. As a result, a secondary particle having substantially a spherical form is obtained. The crystalline, carbon may be non-uniform or disk-shaped crystalline carbon particle. It is also possible to use a flake, spherical or fibrous carbon particle either singularly or by mixing two or more of the graphite particles. It is obviously also possible to use natural or artificial graphite for the crystalline carbon. Furthermore, it is possible to use a pulverized and sieved crystalline carbon or a crystalline carbon including the pulverized and sieved crystalline carbon. The average size of the crystalline carbon is preferably 0.1–30 μm.

The spherical shape making step are almost simultaneous with the coat-gathering step, thereby producing a secondary particle. Although the secondary particles directly use for an active material, it is preferable that the secondary particle is carbonized. The carbonizing step is performed at 700–1400° C.

The mixing and agglomerating step of the coat-gathering step will be now illustrated in more detail.

The crystalline carbon particles are mixed with an amorphous carbon solution. A crystalline carbon particle including minuscule graphite particles is further added to the amorphous carbon solution.

The mixing ratio of the amorphous carbon precursor and crystalline carbon particle is 1:1–1:8 in the weight ratio, preferably, 1:4–1:6 in the weight ratio. If the, amount of the amorphous carbon precursor is more than that of the crystalline carbon particle, the final product, an active material including an excess of amorphous carbon portion may be obtained and therefore, the voltage flatness of the battery using the active material is poor. On the contrary, the amount of the amorphous carbon precursor is less than ⅛ of that of the crystalline carbon particle, the amorphous carbon can not effectively bind with the crystalline carbon particles.

An organic solvent such as tetrahydrofuran is added to the mixture and shaken. The resulting mixture is evaporated to produce the crystalline carbon particles bound therewith through the amorphous carbon precursor.

The resulting crystalline carbon is heated under a gaseous nitrogen atmosphere at about 400–500° C., preferably 430–450° C. for 10 hours. As a result, the amorphous carbon used for a binder in the crystalline carbon particles is changed into 100 wt % mesophase particles. In the heat step, the amorphous carbon layer is thickly formed on the final active material. If the heat step is not performed, the amorphous carbon layer is severely thinly formed.

Thereafter, the heated crystalline carbon is heated under the reduced pressure to remove low molecular materials in the crystalline carbon and heated at 900–1200° C. For having the desirable particle size as the active material for the battery, that is, 15–40 μm of the average diameter, the heated crystalline carbon is pulverized to obtain an active material including minuscule graphite particles bound by the amorphous carbon. The active material of the present invention has a structure of minuscule graphite particles, crystalline carbon, coated with amorphous carbon. The structure can prevent the co-intercalation of the electrolyte and reduce the irreversible capacity of the negative electrode. The crystalline carbon of the negative active material has an plane distance of $d_{002}$ of 3.35–3.4 Å of X-ray diffraction plane distance at the (002) plane and the amorphous carbon has an plane distance of $d_{002}$ of 3.4–3.8 Å of X-ray diffraction plane distance at the (002) plane.

The amount of the amorphous carbon in the negative active material is preferably 5–50 wt % of the total active material. The amount thereof is less than 5 wt %, it is difficult to obtain a crystalline carbon having a desirable shape. On the contrary, the amount exceeds 50 wt %, the voltage flatness is poor due to the excess of the amorphous carbon.

As the negative active material of the present invention has a spherical active material, the packing density increases. Furthermore, the spherical active material has a random orienatation of high crystalline and orientation carbon particles in the step of pressing the electrode, preventing volume expansion and shrinkage of the active material in one direction during the lithium ion absorption/desorption. The microporous channel formed between the primary particles including the crystalline carbon and the amorphous carbon performs that the electrolyte is easily immersed into the negative electrode and can improve high-rate charge/discharge and cycle life characteristics of the battery.

The negative active material of the present invention has at least two exothermic peaks in differential thermal analysis and two or more exothermic peaks overlap to form shoulders. The negative active material having the physical property has the optimized advantages of the crystalline graphite and the amorphous carbon. If a differential thermal analysis is perform on the crystalline graphite, a single exothermic peak generally occurs at 800° C. or more, while a single exothermic peak occurs at 700° C. or less for the amorphous carbon.

Compared to this, a differential thermal analysis performed on the carbonaceous active material of the present invention produces significantly different results. In a differential thermal analysis conducted on the active material of the present invention, it is shown that while an exothermic peak ($P_{carbon}$) of the amorphous carbon did not rarely move, an exothermic peak if ($P_{graphite}$) of the crystalline graphite is moved to a temperature level lower than 800° C. level at which the exothermic peak of the crystalline graphite normally occurs. The exothermic peak ($P_{carbon}$) of the amorphous carbon and the exothermic peak ($P_{graphite}$) of the crystalline graphite are not separated and overlap to form shoulders. Accordingly, a difference in temperature between the exothermic peak ($P_{carbon}$) of the amorphous carbon and the exothermic peak ($P_{graphite}$) of the crystalline graphite are reduced to approximately 200° C., preferably 100° C. In particular, more preferably characteristics of the active material are displayed when the active material peaks are in a range of 550–900° C., and a peak intensity ratio $P_{carbon}/P_{graphite}$ between the exothermic peaks of the amorphous carbon and the crystalline graphite is 1 or less. If the peak intensity ratio $P_{carbon}/P_{graphite}$ exceeds 1, this indicates that there is a large amount of the amorphous carbon which results in a reduction in charge/discharge efficiency and in other battery characteristics. However, if boron is added to the crystalline graphite portion of the inventive active material, the exothermic peak of the crystalline graphite occurs at a level over 900° C., or more precisely, at a temperature of approximately 960° C. It is common to add boron to the crystalline graphite when producing the same since doing so enables a reduction in a graphitization temperature.

As described above, by either coating the surface of the crystalline graphite with the amorphous carbon, or combining the graphite and the amorphous carbon by coat-gathering, the surface of the amorphous carbon is effected by the crystalline graphite during the carbonization such that the crystallization increases. As a result, the disadvantages of the amorphous carbon are minimized, and by the covering of the surface of the amorphous carbon by the crystalline graphite, the disadvantages of the crystalline graphite are also minimized.

Furthermore, the negative active material of the present invention has an intensity ratio I(110)/I(002) of an X-ray diffraction peak intensity I(002) at a (002) plane to an X-ray diffraction peak intensity I(110) at a (110) plane of less than 0.04. The negative active material has the crystalline graphite and the amorphous carbon having a turbostratic structure. The crystalline carbon has an intensity ratio I(1360)/I(1580) of a Raman Spectroscopy peak intensity I(1580) at a 1580 Å to a Raman spectrum peak intensity I(1360) at a 1360 Å of less than 0.3. The amorphous carbon has an intensity ratio I(1360)/I(1580) of a Raman spectrum peak intensity I(1580) at a 1360 Å to a Raman spectrum peak intensity I(1360) at a 1360 of more than 0.2. In the application, the turbostratic structure means that a structure has an extremely low crystallinity and small crystal size so that the structure is similar to an amorphous structure and has random orientation.

As described above, a surface of the negative active material of the present invention includes the amorphous carbon or the turbostaratic structure carbon. Accordingly, a battery with the negative active material of the present invention can use propylene carbonate which can not be used in the conventional battery with graphite active material.

Generally, graphite used for the negative active material can increase capacity and has a disadvantage of reaction with an organic solvent in electrolyte. It is considered that linear carbonate such as ethylene carbonate, dimethyl carbonate, ethyl methyl carbonate and diethyl carbonate is used for organic solvent having good charge/discharge performance to the graphite. Ethylene carbonate has a poor reactivity to the graphite, but has high viscosity and at least 36° C. of the fusing point?, thereby deteriorating the low temperature characteristics.

For solving the problems, it is also considered that propylene carbonate having low fusing point is used for the solvent of the electrolyte. However, propylene carbonate actively reacts with graphite, severely lowering irreversible capacity. Due to the reason, propylene carbonate can not be used for the organic solvent of the electrolyte in the battery including graphite. On the contrary, the negative active material of the present invention has a surface of turbostratic structure rather than totally crystalline structure, lowering reactivity to graphite. Therefore, the negative active material of the present invention can prevent the charge/discharge capacity and efficiency decrease due to the propylene carbonate and increase the amount of ethylene carbonate, increasing the cycle life.

In the present invention, the exemplary of the organic solvent of the electrolyte is at least 51 volume percents of cyclic carbonate and linear carbonate. The cyclic carbonate may be ethylene carbonate, propylene carbonate or a mixture thereof and the linear carbonate may be dimethyl carbonate, ethyl methyl carbonate, diethyl carbonate or a mixture thereof. Furthermore, propylene acetate may be used for the organic solvent of the electrolyte.

Alternatively, the organic solvent may be included a first mixture of ethylene carbonate, diethyl carbonate and propylene carbonate. The first mixture preferably includes 10–50 volume percent of propylene carbonate and equivalent amounts of ethylene carbonate and dimethyl carbonate. The mixture may be included at least 13 wt % of diethyl carbonate of total electrolyte instead of propylene carbonate.

The another organic solvent of the electrolyte includes a second mixture of ethylene carbonate, dimethyl carbonate, diethyl carbonate and propylene carbonate. The second mixture includes 5–30 volume percent of propylene carbonate, ethylene carbonate, dimethyl carbonate and diethyl carbonate in the volume ratio of 3:3:1.

The another organic solvent of the electrolyte includes a third mixture of ethylene carbonate, diethyl carbonate and propyl acetate. The third mixture includes 5–60 volume percent of propyl acetate and equivalent amounts of ethylene carbonate and diethyl carbonate. For example, the third solvent includes 5–60% of propyle acetate, 20–70% of cyclic carbonate and 20–70% of linear carbonate.

In the present invention, a lithium salt of the electrolyte may include $LiPF_6$, $LiBF_4$, $LiAsF_6$, $LiCF_3SO_3$, $LiN(CF_3SO_2)_3$, $LiBF_6$ or $LiClO_4$.

A positive electrode of the present invention is prepared by using lithium transition oxides such as $LiMN_2$ (M is Co, Ni, Mn or a mixture thereof and N is O, S, F or a mixture thereof), $LiMn_2O_4$, $LiCoO_2$, $LiNiO_2$, $LiMn_2O_4$ or $LiNi_xCo_{1-x}$ Oy ($0<x<1$, $0<y\leq 2$).

The negative or positive electrodes is prepared by the conventional method. For example, the negative or positive active material, and a polyvinylidene fluoride binder are dissolved in N-methyl pyrrolidone to prepare an active material slurry, the slurry is coated on a foil and the coated foil is dried.

A separator of the present invention may include a porous polymer film such as polyethylene or polypropylene. In the case of a lithium ion polymer using a solid electrolyte, the solid electrolyte acts on both separator and electrolyte so that the separator is not necessary. The solid electrolyte is prepared by immersing the inventive electrolyte into a copolymer matrix such as polyvinylidene fluoride and hexafluoropropylene with a plasticizer such as dibutylphtalate. Instead of the copolymer materix, a polymer materix such as polyacrylonitrile may be used.

According to the conventional method of preparing a lithium secondary battery such as a lithium ion battery, a lithium ion polymer battery, those skilled in the art can make a lithium ion battery using the negative and positive active materials, electrolyte and separator of the present invention. The battery shape includes cylindrical, symmetrical and coin battery.

The present invention is further explained in more detail with reference to the following examples which are the scope of this invention

EXAMPLE 1

Coal pitch was dissolved in tetrahydrofuran and insoluble components were removed therefrom. The residual component, tetrahydrofuran-soluble pitch was dissolved in tetrahydrofuran to prepare an amorphous carbon precursor solution (30% of the content of solid).

300 g of disk-shaped artificial graphite having a particle diameter of about 5 $\mu$m was placed in a powder agglomaster and dried by using hot air.

500 g of the amorphous carbon precursor solution was sprayed to the artificial graphite powder which was flowed by a double-barrel nozzle, at a rate of 13 g/min. At this time, a weight ratio between the disk-shaped artificial graphite and the amorphous carbon precursor was 5:2. Thereafter, a circular plate of the powder agglomaster was rotated at 500 rpm such that while the disk-shaped artificial graphite particles were gathered to produce a secondary particle, the amorphous carbon precursor was coated on the secondary particles. As a result, spherical shape particles were obtained. The secondary particles were dried and heat-treated for 2 hours at 1000° C. to produce carbonaceous active material.

EXAMPLE 2

A carbonaceous material was prepared by the same procedure in Example 1 except that nature graphite particles with a diameter of about 18 μm was used instead of the disk-shaped artificial graphite.

EXAMPLE 3

A carbonaceous material was prepared by the same procedure in Example 1 except that a mixture of nature graphite particles with a diameter of about 18 μm and disk-shaped graphite particles with a diameter of about 6 μm in the weight ratio of 4:1 was used instead of the disk-shaped graphite particles.

EXAMPLE 4

A carbonaceous material was prepared by the same procedure in Example 1 except that a mixture of nature graphite particles with a diameter of about 18 μm and disk-shaped graphite particles with a diameter of about 5 μm in the weight ratio of 4:1 was used instead of the disk-shaped graphite particles.

EXAMPLE 5

A carbonaceous material was prepared by the same procedure in Example 1 except that a mixture of nature graphite particles with a diameter of about 18 μm and disk-shaped graphite particles with a diameter of about 6 μm in the weight ratio of 3:2 was used instead of the disk-shaped graphite particles.

EXAMPLE 6

A carbonaceous material was prepared by the same procedure in Example 1 except that a mixture of nature graphite particles with a diameter of about 18 μm and disk-shaped graphite particles with a diameter of about 5 μm in the weight ratio of 4:1 was used and the weight ratio between graphite and amorphous carbon was 5:1.

EXAMPLE 7

A carbonaceous material was prepared by the same procedure in Example 1 except that a mixture of nature graphite particles with a diameter of about 18 μm and disk-shaped graphite particles with a diameter of about 5 μm in the weight ratio of 4:1 was used instead of the disk-shaped graphite particles and phenol resin was used instead of coal pitch.

Comparative Example 1

Disk-shaped artificial graphite powder was used for a carbonaceous active material.

Comparative Example 2

Flake nature graphite powder with a diameter of about 18 μm was used for a carbonaceous active material.

Comparative Example 3

100 g of a mixture of nature graphite with a diameter of about 18 μm and disk-shaped artificial graphite with a diameter of about 6 μm was added to a mixed solution of phenol resin in tetrahydrofuran (concentration:20%). The resulting mixture was refluxed and filtered. The filtrated powder was carbonized for 2 hours at 1000° C. As a result, a carbonaceous material having a crystalline carbon core and a carbon shell formed on the core.

Each of the carbonaceous materials according to the Examples 1 to 7 and comparative examples 1–3 was mixed with a solition of polyvinylidene fluoride binder in a N-methyl pyrrolidone solvent to be thereby made into a slurry. Then, the slurry was coated on a collector made of copper foil to thereby form a negative electrode plate. Next, a lithium secondary half-type cell was prepared using the negative electrode plate together with a current electrode made of lithium metal foil and an electrolyte of 1 M $LiPF_6$ in an organic solvent of ethylene carbonate and dimethyl carbonate. The discharge capacity, capacity and discharge efficiency (discharge capacity/ charge capacity), high-rate capacity and cycle life were measured and the results are presented in Table 1. In Table 1, Com. means comparative example.

TABLE 1

| | Active material | | | | Electrode |
|---|---|---|---|---|---|
| | Average diameter μm | Specific surface area [m²/g] | d002 [Å] | Lc [Å] | Density [g/cc] (pressure: 1 ton/cm²) |
| Example 1 | 20.1 | 1.9 | 3.368 | 905 | 1.7 |
| Example 2 | 53.1 | 2.1 | 3.361 | 1598 | 1.6 |
| Example 3 | 38.4 | 2.5 | 3.360 | 610 | 1.7 |
| Example 4 | 47.8 | 2.7 | 3.364 | 690 | 1.6 |
| Example 5 | 35.4 | 1.2 | 3.364 | 810 | 1.6 |
| Example 6 | 27.8 | 3.7 | 3.361 | 1035 | 1.7 |
| Example 7 | 54.2 | 6.7 | 3.361 | 715 | 1.6 |
| Example 8 | 43.1 | 1.5 | 3.360 | 1010 | 1.5 |
| Com. 1 | 6.2 | 15.2 | 3.365 | 408 | 1.9 |
| Com. 2 | 18.2 | 12.1 | 3.356 | 2020 | 2.0 |
| Com. 3 | 19.2 | 5.3 | 3.357 | 2040 | 1.9 |

| | Cell characteristics | | | |
|---|---|---|---|---|
| | Discharge capacity [mAh/g] | Efficiency [%] | High-rate capacity (1C capacity) | Cycle life (50 cycle, %) |
| Example 1 | 345 | 89.1 | 340 | 92 |
| Example 2 | 353 | 90.1 | 345 | 93 |
| Example 3 | 352 | 90.6 | 340 | 92 |
| Example 4 | 345 | 88.0 | 338 | 91 |
| Example 5 | 351 | 91.4 | 345 | 93 |
| Example 6 | 352 | 90.1 | 342 | 90 |
| Example 7 | 355 | 86 | 348 | 91 |
| Example 8 | 351 | 92 | 345 | 93 |
| Com. 1 | 340 | 80 | 270 | 85 |
| Com. 2 | 335 | 83 | 250 | 84 |
| Com. 3 | 320 | 87 | 295 | 86 |

As shown in Table 1, the specific surface area of the active materials according to Examples 1–8 has smaller specific area than that of comparative examples 1–2 (examples 1–8:1.5–6 m2/g, comparative examples 1–2:12–15 m2/g). The diameter of Examples 1–8 is 25 μm and more and larger than that of comparative examples 1–2. Therefore, it is considered that the shape of the examples 1–8 is spherical. The electrode density of comparative examples 1–3 greatly increases by totally orientating according to the pressing step, but examples 1–8 do not show the result.

Figure 2A:
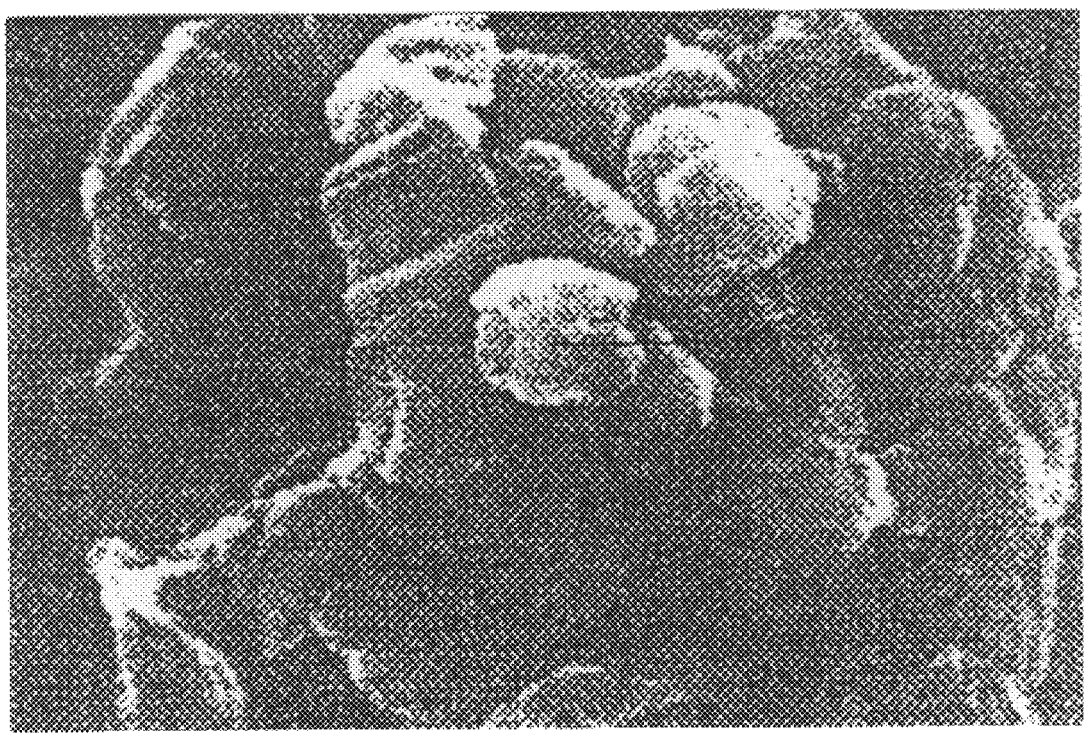
FIG. 2A is a SEM photograpghy of a negative active material of the present invention.
Figure 2B:
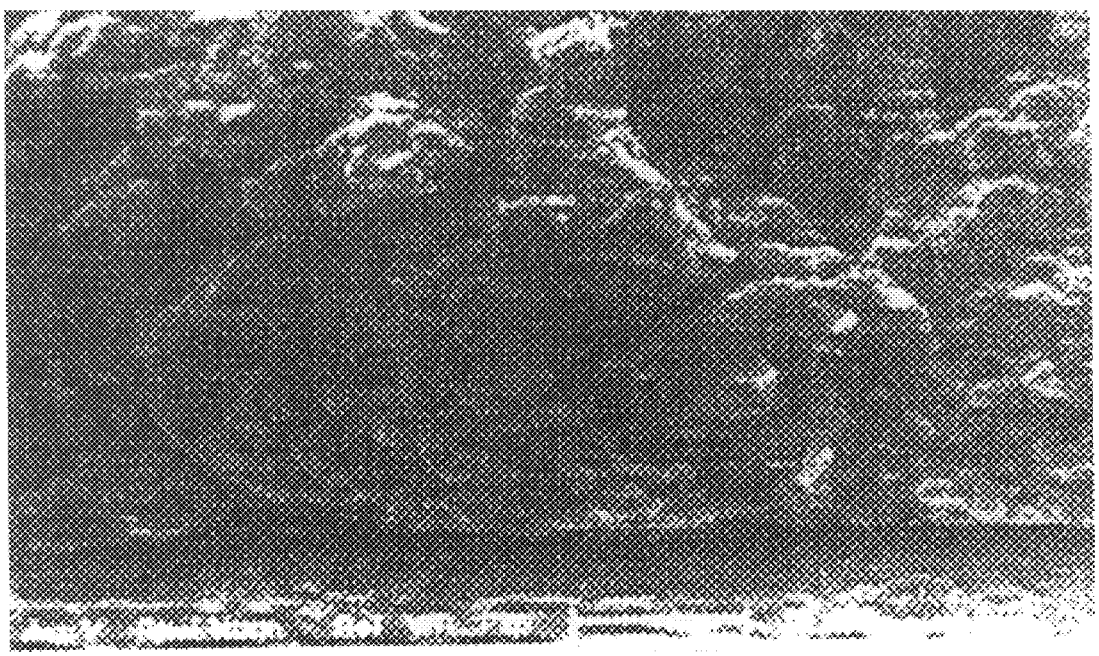
FIG. 2B is a SEM photography of a negative electrode prepared by the negative active material of the present invention.
Figure 3A:
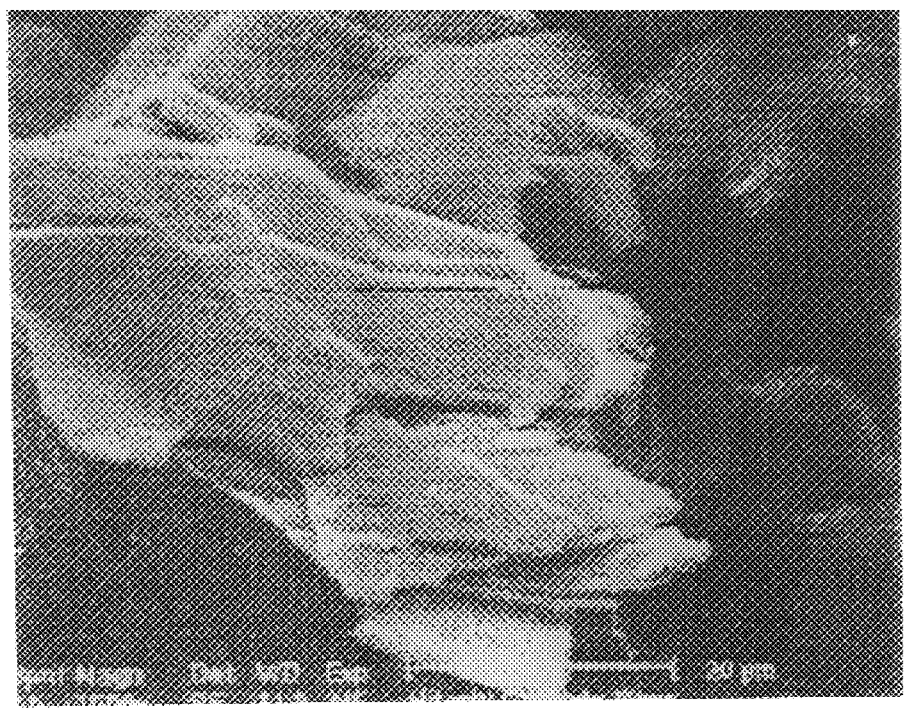
FIG. 3A is a SEM photography of a negative active material of comparative example of the present invention.
Figure 3B:
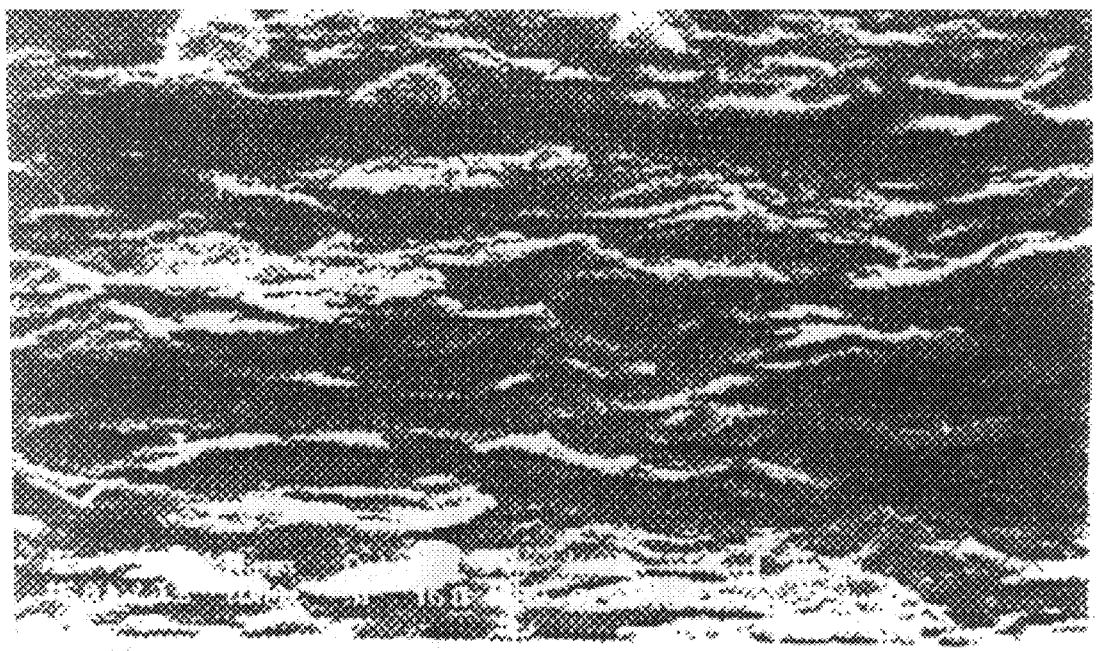
FIG. 3B is a SEM photography of a negative electrode prepared by the negative active material of comparative example of the present invention.

FIG. 2A shows the structure of active material of example 3 and FIG. 2A indicates a spherical form. FIG. 3A shows that of comparative example 2 and FIG. 3A indicates a flake form. Furthermore, a surface of an electrode of example 3 shown in FIG. 2B is significantly different with that of comparative example 2 shown in FIG. 3B. As described above, as the active material of the example has a spherical form, the packing density is large. Furthermore, the active material of comparative example shows totally orientation during the pressing step, but that of example shows a random orientation of crystalline carbon and good high-rate charge/discharge and cycle life characteristics.

As shown in Table 1, the cell of examples 1–8 has good high-rate and cycle life characteristics compared to that comparative examples 1–2. These results is caused by easily immersing electrolyte into the negative active material of the present invention, owing to the microporous channel generated between primary particles. In Table 1, the cycle life characteristic indicates a percentage of capacity after 50 charge/discharge cycles per initial capacity.

As shown in Table 1, examples 1–8 has good charge/discharge efficiency compared to comparative examples 1–2.

Furthermore, comparative example 3 improves efficiency according to the use of amorphous carbon, but do not improve high-rate characteristic. Examples 1–8 has good high-rate charge/discharge characteristic compared with comparative example 3.

For determining a structure of the active material of example 5 and comparative examples 2–3, differential thermal analysis was performed. The differential thermal analysis was performed in a normal air atmosphere and in a state where the temperature increased at a rate of 10° C. The results are shown in Table 2. Example 5 has single amorphous carbon exothermic peak at 700° C. or less and single crystalline carbon peak at 700° C. or more. Accordingly, the coat-gathered material of the present invention has crystal-amorphous mixed structure.

TABLE 2

| | First peak (° C.) | Second peak (° C.) | Number of peak |
|---|---|---|---|
| Example 5 | 674 | 790 | 2 |
| Comparative example 2 | — | 860 | 1 |
| Comparative example 3 | | 848 | 1 |

As shown in Table 2, the negative active material of the present invention has totally good charge/discharge characteristics such as efficiency, high-rate and cycle life and has two exothermic peaks of differential thermal analysis at 1000° C. or less. The amorphous carbon remained in the negative active material of the present invention after the carbonizing step can maintain a random orientation of flake or disk-shaped crystalline carbon and spherical form. Therefore, the active material having single amorphous and single crystalline exothermic peaks has excellent characteristics.

EXAMPLE 9

Coal pitch was dissolved in tetrahydrofuran and insoluble components were removed therefrom. The residual component, tetrahydrofuran-soluble pitch was dissolved in tetrahydrofuran to prepare an amorphous carbon precursor solution (30% of the content of solid).

300 g of a mixture of nature graphite having a diameter of about 18 $\mu$m and disk-shaped artificial graphite having a diameter of about 8 $\mu$m in the weight ratio of 3:2 was placed in a powder agglomaster and dried by using hot air.

500 g of the amorphous carbon precursor solution was sprayed to the artificial graphite powder which was flowed by a double-barrel nozzle, at a rate of 13 g/min. At this time, a weight ratio between the disk-shaped artificial graphite and the amorphous carbon precursor was 5:2. Thereafter, a circular plate of the powder agglomaster was rotated at 500 rpm such that while the disk-shaped artificial graphite particles were gathered to produce a secondary particle, the amorphous carbon precursor was coated on the secondary particles. As a result, spherical shape particles were obtained. The secondary particles were dried and heat-treated for 2 hours at 1000° C. to produce carbonaceous active material.

The carbonaceous material was mixed with a solution of polyvinylidene fluoride binder in a N-methyl pyrrolidone solvent to be thereby made into a slurry. Then, the slurry was coated on a collector made of copper foil to thereby form a negative electrode plate. Next, a lithium secondary half-type cell was prepared using the negative electrode plate together with a current electrode made of lithium metal foil and an electrolyte of 1M $LiPF_6$ in an organic solvent of ethylene carbonate, dimethyl carbonate and propylene carbonate in the volume ratio of 4:4:1.

EXAMPLE 10

A lithium secondary cell was manufactured by the same procedure in Example 9 except that an electrolyte including 1M $LiPF_6$ and an organic solvent of ethylene carbonate, dimethyl carbonate and propylene carbonate in the volume ratio of 42.5:42. 5:15 was used.

EXAMPLE 11

A lithium secondary cell was manufactured by the same procedure in Example 9 except that an electrolyte including 1M $LiPF_6$ and an organic solvent of ethylene carbonate, dimethyl carbonate and propylene carbonate in the volume ratio of 2:2:1 was used.

EXAMPLE 12

A lithium secondary cell was manufactured by the same procedure in Example 9 except that an electrolyte including 1M $LiPF_6$ and an organic solvent of ethylene carbonate, dimethyl carbonate and diethyl carbonate in the volume ratio of:4:1 was used.

EXAMPLE 13

A lithium secondary cell was manufactured by the same procedure in Example 9 except that an electrolyte including 1M $LiPF_6$ and an organic solvent of ethylene carbonate, dimethyl carbonate, dietyl carbonate and propylene carbonate in the volume ratio of 36:36:12:16 was used.

EXAMPLE 14

A lithium secondary cell was manufactured by the same procedure in Example 9 except that an electrolyte including 1M $LiPF_6$ and an organic solvent of ethylene carbonate, dimethyl carbonate and propyl acetate in the volume ratio of 3:3:4 was used.

Comparative Example 4

A lithium secondary cell was manufactured by the same procedure in Example 9 except that flake nature graphite was used.

Comparative Example 5

100 g of a mixture of nature graphite with a diameter of about 18 $\mu$m and a disk-shaped artificial graphite in the weight ratio of 3:2 was added a solution of 20 g of phenol resin in tetrahdyrofuran. The mixed solution was refluxed and filtered. The filtered powder was carbonized at 1000° C.

for 2 hours. As a result, a carbonaceous material including a crystalline carbon core and an amorphous carbon shell formed on the core.

The carbonaceous material was mixed with a solution of polyvinylidene fluoride binder in a N-methyl pyrrolidone solvent to be thereby made into a slurry. Then, the slurry was coated on a collector made of copper foil to thereby form a negative electrode plate. Next, a lithium secondary half-type cell was prepared using the negative electrode plate together with a current electrode made of lithium metal foil and an electrolyte of 1M $LiPF_6$ in an organic solvent of ethylene carbonate and dimethyl carbonate in the volume ratio of 4:4:1.

Comparative Example 6

A lithium secondary cell was manufactured by the same procedure in Example 9 except that an electrolyte including 1M $LiPF_6$ and an organic solvent of ethylene carbonate and dimethyl carbonate in the volume ratio of 1:1 was used.

Comparative Example 7

A lithium secondary cell was manufactured by the same procedure in comparative example 4 except that an electrolyte including 1M $LiPF_6$ and an organic solvent of ethylene carbonate, dimethyl carbonate and propylene acetate in the volume ratio of 2:2:1 was used.

Comparative Example 8

A lithium secondary cell was manufactured by the same procedure in comparative Example 9 except that an electrolyte including 1M $LiPF_6$ and an organic solvent of ethylene carbonate, dimethyl carbonate and propylene acetate in the volume ratio of 2:2:1 was used.

The discharge capacity, capacity and discharge efficiency (discharge capacity/charge capacity), high-rate capacity and cycle life of cells according to examples 9–14 and comparative examples 4–8 were measured and the results are presented in Table 3.

TABLE 3

| | Active material | | | |
|---|---|---|---|---|
| | Average diameter (μm) | Specific surface area (m²/g) | $d_{002}$ | Lc (Å) |
| Example 9 | 47.8 | 1.7 | 3.364 | 690 |
| Example 10 | 47.8 | 1.7 | 3.364 | 690 |
| Example 11 | 47.8 | 1.7 | 3.364 | 690 |
| Example 12 | 47.8 | 1.7 | 3.364 | 690 |
| Example 13 | 47.8 | 1.7 | 3.364 | 690 |
| Example 14 | 47.8 | 1.7 | 3.364 | 690 |
| Com. 4 | 18.2 | 12.1 | 3.356 | 2020 |
| Com. 5 | 19.2 | 5.3 | 3.357 | 2040 |
| Com. 6 | 47.8 | 1.7 | 3.364 | 690 |
| Com. 7 | 18.2 | 12.1 | 3.356 | 2020 |
| Com. 8 | 18.3 | 8.7 | 3.357 | 2040 |

| | Cell characteristics | | | |
|---|---|---|---|---|
| | Discharge capacity (mAh/g) | Efficiency (%) | High-rate characteristics (1C capacity) | Cycle life (100th cycle, %) |
| Example 9 | 345 | 90 | 340 | 81 |
| Example 10 | 348 | 90 | 340 | 80 |
| Example 11 | 347 | 89 | 339 | 80 |
| Example 12 | 346 | 89 | 339 | 79 |
| Example 13 | 348 | 89 | 340 | 79 |
| Example 14 | 343 | 88 | 337 | — |
| Com. 4 | 345 | 80 | 289 | 75 |
| Com. 5 | 320 | 87 | 295 | 78 |
| Com. 6 | 348 | 90 | 338 | 80 |
| Com. 7 | 343 | 85 | 335 | 60 |
| Com. 8 | 310 | 83 | 310 | 63 |

As shown in Table 3, the negative active material according to examples 9–14 has low specific surface area of about 1.7 m²/g compared to comparative examples 4–8. The diameter of the negative active material of examples 9–14 is 47 μm than that of comparative examples 4–8. Therefore, it is shown that the active material of the present invention has spherical form. Furthermore, as the spherical active material can increase a packing density on the electrode, the cells of examples 9–14 has good high-rate charge/discharge and cycle life characteristics compared to comparative examples 4–8.

The charge/discharge efficiency and cycle life characteristic according to the type of the electrolyte were determined by using the batteries of example 11 and comparative example 6. The results show that the charge/discharge efficiency and cycle life of the cell of example 11 are similar to that of comparative example 6. That is, although the cell of example 11 uses propylene carbonate which shows good low temperature and stability but good reactivity with graphite, lowering capacity, capacity do not decrease. Therefore, a battery having good low temperature and stability can be prepared by using the active material of the present invention without the capacity decrease. In Table 3, the cycle life characteristic indicates a percentage of capacity after 100th charge/discharge cycle per initial capacity.

Generally, when an electrolyte such as propylene carbonate, diethyl carbonate or propyl acetate is used in a battery using crystalline active material such as nature or artificial graphite, the charge/discharge efficiency and capacity decrease. On the contrary, as the active material of the present invention has an amorphous carbon surface where an electrolyte is contacted, the electrolyte such as propylene carbonate, diethyl carbonate or propyl acetate is used in the lithium secondary battery using graphite active material without decrease of capacity. In particular, the cells of examples 9–14 which uses negative active material having an amorphous carbon surface and an amorphous carbon binder between the crystalline carbon particles, has good charge/discharge efficiency compared to comparative examples 4–5.

As the cells of examples 9–14 use an electrolyte including propylene carbonate, propyl acetate or diethyl carbonate, the batteries has good low temperature and stability.

EXAMPLE 15

Coal pitch or petroleum pitch was dissolved in tetrahydrofuran and evaporated to prepare a tetrahydrofuran-soluble pitch.

The tetrahydrofuran-soluble pitch was mixed with flake amorphous particles having a maximum diameter of 5 μm in the weight ratio of 1:6. The predetermined amount of tetrahydrofuran was added to the mixture and shaken. The mixed solution was evaporated and the evaporated material was heated at 430° C. for 10 hours under the nitrogen atmosphere and heat-treated under the pressed pressure. Next, the heat-treated material heat-treated at 1000° C. for 2 hours and pulverized. As a result, a negative active material having an average diameter of 15–40 μm was produced.

The carbonaceous material was mixed with a solution of polyvinylidene fluoride binder in a N-methyl pyrrolidone solvent to be thereby made into a slurry. Then, the slurry was coated on a collector made of copper foil to thereby form a negative electrode plate. Next, a lithium secondary half-type cell was prepared using the negative electrode plate together with a current electrode made of lithium metal foil and an electrolyte of 1M $LiPF_6$ in an organic solvent of ethylene carbonate and dimethyl carbonate.

EXAMPLE 16

A lithium secondary cell was manufactured by the same procedure in Example 15 except that tetrahydrofuran-soluble pitch was mixed with flake graphite having a maximum diameter of 5 $\mu$m in the weight ratio of 1:4.

EXAMPLE 17

A lithium secondary cell was manufactured by the same procedure in Example 15 except that tetrahydrofuran-soluble pitch was mixed with flake graphite having a maximum diameter of 5 $\mu$m in the weight ratio of 1:1.

Comparative Example 9

A lithium secondary cell was manufactured by the same procedure in Example 15 except that graphite particles was used for a negative active material and an electrolyte including LiPF6 and an organic solvent of ethylene carbonate and dimethyl carbonate.

Comparative Example 10

Coal pitch was dissolved in tetrahydrofuran and evaporated to prepare a tetrahydrofuran-soluble pitch.

The tetrhydrofuran-soluble pitch was heat at 430° C. for 10 hours and heat-treated under the suction. Next, the heat-treated pitch was repeatedly heat-treated at 1000° C. for 2 hours and graphitized at 2800° C. The grapitized pitch was pulverized and sieved to thereby produce a negative active material.

Using the obtained negative active material and an electrolyte of LiPF6 in an organic solvent of ethylene carbonate and dimethyl carbonate, a lithium secondary cell was prepared by the same procedure in Example 15.

The charge capacity, discharge capacity and charge/discharge efficiency of batteries according to examples 15–17 and comparative examples 9–10 were determined and the results are shown in Table 4.

TABLE 4

|  | Charge capacity (mAh/g) | Discharge capacity (mAh/g) | Charge/discharge efficiency (%) |
| --- | --- | --- | --- |
| Example 15 | 404 | 372 | 92.1 |
| Example 16 | 410 | 368 | 89.8 |
| Example 17 | 415 | 370 | 89.2 |
| Com. 9 | 431 | 345 | 80.0 |
| Com. 10 | 452 | 320 | 70.8 |

As shown in Table 4, the batteries of examples 15–17 has good charge/discharge efficiency compared to comparative examples 9–10. That is, the negative active material of examples 15–17 has the surface of graphite coated with the amorphous carbon so that the side reaction with the electrolyte was reduced and discharge capacity and irreversible capacity increased.

EXAMPLE 18

100 g of nature graphite, crystalline carbon was refluxed in 30% of sulfuric acid in order to activate. The activated nature graphite 100 g was added to a solution of 20 g of phenol resin in tetrahydrofuran (concentration 20%) and mixed. The mixture was re-refluxed and heat-hardened at 110° C. to prepare powder. The powder was carbonized at 1000° C. for 2 hours under a gaseous nitrogen atmosphere. As a result, a negative active material including nature graphite coated with amorphous carbon, a crystalline carbon core and an amorphous carbon shell, was produced.

90 wt % of the produced active material and 10 wt % of a polyvinylidene fluoride binder were added to a N-methyl pyrrolidone solvent to be thereby made into a slurry. Then, the slurry was coated on a collector made of copper foil to thereby form a negative electrode plate. Next, a lithium secondary half-type cell was prepared using the negative electrode plate together with a current electrode made of lithium metal foil.

EXAMPLE 19

Coal pitch was was dissolved in toluene and insoluble components were removed therefrom. The residual component, toluene-soluble pitch was dissolved in toluene to prepare an amorphous carbon precursor solution.

200 g of nature graphite having a diameter of about 18 $\mu$m was placed in a powder agglomaster and dried by using hot air.

The amorphous carbon precursor solution was sprayed to the artificial graphite powder which was flowed by a double-barrel nozzle, at a rate of 13 g/min. At this time, a weight ratio between the disk-shaped artificial graphite and the amorphous carbon precursor was 5:2. Thereafter, a circular plate of the powder agglomaster was rotated at 500 rpm such that while the disk-shaped artificial graphite particles were gathered to produce a secondary particle, the amorphous carbon precursor was coated on the secondary particles. As a result, spherical shape particles were obtained. The secondary particles were dried and heat-treated for 2 hours at 1000° C. to produce carbonaceous active material.

Using the produced negative active material, a lithium coin-type secondary cell was manufactured by the same procedure in Example 18.

EXAMPLE 20

Coal pitch was dissolved in light oil to prepare an amorphous carbon solution (concentration:20%). 200 g of nature graphite was immersed into 100 g of the amorphous carbon precursor solution. The obtained nature graphite immersed with the amorphous carbon precursor was carbonized at 1000° C. for 2 hours under a gaseous nitrogen atmosphere. Next, the immersing and carbonizing steps were repeated three times. Using the produced negative active material, a lithium coin-type secondary cell was prepared by the same procedure in Example 18.

Comparative Example 11

A lithium coin-type secondary cell was manufactured by the same procedure in Example 18 except that nature graphite was used.

Figure 4:
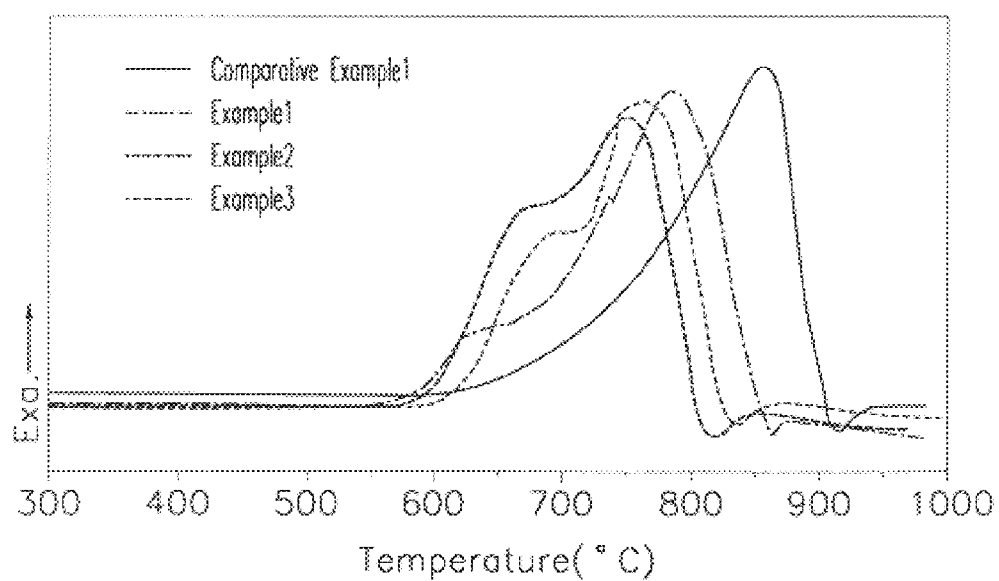
FIG. 4 is a graph showing a differential thermal analysis results of example and comparative example of the present invention.

In order to determine that the amorphous carbon shell of the active material of the present invention has an intermediate structure between the crystalline and amorphous structure, a differential thermal analysis was performed (using a differential thermal analyzer from TA instrument, Co.) on the negative active material according to examples 18–20 and comparative example 11. The differential thermal analysis was performed in a normal air atmosphere and in a state where the temperature increased from room temperature to 1000° C. at a rate of 10° C./min. The results are shown in FIG. 4

If an exothermic peak of the differential thermal analysis of one carbonaceous material occurs at 700° C. or less, the result indicates that the material has an amorphous. As shown in FIG. 4, the active material of comparative active material including only crystalline carbon has single exothermic peak at 800–900° C. On the other hand, the exothermic peak of the active materials of examples 19–20 does not occur at a significantly different temperature than at where the exothermic peak for this material normally occurs, an exothermic peak of the crystalline graphite occurs at a far lower temperature of about 100° C. than normal for this temperature.

The occurrence of the exothermic peak of the amorphous carbon at a temperature slightly higher than normal is a result of a portion of the amorphous carbon undergoing graphitization at about 1000° C. With regard to the exothermic peak of the crystalline graphite occurring at a temperature about 100° C. lower than normal, this is a result of the amorphous carbon and the crystalline graphite being formed in single particles, rather than undergoing simple mixing. Accordingly, thermal transmission to the crystalline graphite is realized smoothly. As described above, while an exothermic peak of the amorphous carbon moved at a temperature slightly higher than normal, the exothermic peak overlapped with an exothermic peak of the crystalline graphite. That is, the crystalline exothermic peak does not separated with the amorphous carbon exothermic peak, but overlap to form shoulder over from about 700 to 900° C. The results indicates that the amorphous carbon shell of the active material of the present invention has an intermediate structure between the amorphous carbon and crystalline structures.

The cells of examples 18–20 and comparative example 11 were charged and discharged at 0.2 C., respectively and capacity and efficiency were determined. The results are shown in Table 5. Furthermore, each of these batteries was charged and discharged at 1 C. and capacity was determined. The results are shown in Table 5. In Table 5, EC refer to ethylene carbonate, DMC refer to dimethyl carbonate, DEC refer to diethyl carbonate and PC refer to propylene carbonate.

TABLE 5

| | EC/DMC/DEC(3/3/1) | | | EC/DMC/DEC/PC (39/37/12/1) | | |
|---|---|---|---|---|---|---|
| | Capacity [mAh/g] | Efficiency [%] | High-rate charge/Discharge capacity [mAh/g] | Capacity [mAh/g] | Efficiency [%] | High-rate charge/discharge capacity [mAh/g] |
| Ex. 18 | 362 | 91 | 322 | 354 | 90.5 | 320 |
| Ex. 19 | 354 | 90 | 350 | 355 | 90.5 | 348 |
| Ex. 20 | 345 | 89.5 | 335 | 347 | 90 | 336 |
| Com. 11 | 335 | 83 | 265 | 320 | 44 | 124 |

As shown in Table 5, the cells of example 18–20 has good capacity, efficiency and high-rate charge/discharge capacity compared with comparative example 11. Furthermore, although the cells of examples 18–20 use an electrolyte including propylene carbonate, capacity, efficiency and high-rate charge/discharge capacity can not reduced.

EXAMPLE 21

94 wt % of $LiCoO_2$, 3 wt % of a polyvinylidene fluoride binder and 3 wt % of carbon black as a conducting agent were added to a N-methyl pyrrolidone solvent to be thereby made into a positive active material slurry. The positive active material slurry was coated on a collector made of Al foil to thereby form a positive electrode. 1M $LiPF_6$ was dissolved in a mixed organic solvent of ethylene carbonate, dimethyl carbonate and diethyl carbonate to prepare an electrolyte.

Next, a lithium secondary 18650 full-type cell was prepared using the positive electrode together with and the electrolyte and the negative electrode of example 18.

EXAMPLE 22

A lithium full-type cell was manufactured by the same procedure in Example 21 except that the negative electrode of example 19 was used.

EXAMPLE 23

A lithium full-type cell was manufactured by the same procedure in Example 21 except that the negative electrode of example 20 was used.

EXAMPLE 24

A lithium full-type cell was manufactured by the same procedure in Example 21 except that a mixed organic solvent including ethylene carbonate, dimethyl carbonate, diethyl carbonate and propylene carbonate was used.

EXAMPLE 25

A lithium full-type cell was manufactured by the same procedure in Example 22 except that a mixed organic solvent including ethylene carbonate, dimethyl carbonate, diethyl carbonate and propylene carbonate was used.

EXAMPLE 26

A lithium full-type cell was manufactured by the same procedure in Example 23 except that a mixed organic solvent including ethylene carbonate, dimethyl carbonate, diethyl carbonate and propylene carbonate was used.

Comparative Example 12

A lithium full-type cell was manufactured by the same procedure in Example 21 except that the negative electrode of comparative example 11 was used.

The capacity decreases according to the number of charge/discharge cycle of batteries of examples 21–26 and comparative 12 were determined and the results are shown in FIG. 5. As shown in FIG. 5, after 400th charge/discharge cycles, the cells of examples 21–26 has capacity corresponding to 80% of the initial capacity. On the contrary, after about 50th the cell of comparative example 12 has capacity corresponding to 50% of the initial capacity. Furthermore, while the cells of examples 21–26 uses propylene carbonate for an organic solvent of an electrolyte, capacity increases. Accordingly, propylene carbonate having good low temperature can be used in the present invention.

As the active material of the present invention has a spherical form, the packing density can be improved. Furthermore, the active material of the present invention has random orientation of high crystallinity and orientation carbon particles, preventing the volume expansion and shrinkage of the active material in the one direction during the charge/discharge. In the pressing step of the electrode preparation, it can be suppressed to wholly orient non-uniform or disk-shaped active material and it can be prevented to extremely increase the density of the electrode. Furthermore, using the active material prepared by coating the crystalline carbon with the amorphous carbon, the battery having good voltage flatness can be manufactured. The electrolyte is easily immersed into the active material of the present invention by generating microporous channel between the active material particles, resulting in good high-rate characteristic. Furthermore, it can be controlled for desirable size of the crystalline carbon particles, reducing production cost. In other words, the battery of the present invention has high capacity, high-rate charge/discharge and cycle life characteristics as the spherical active material is used. In particular, as an electrolyte including propylene carbonate, diethyl carbonate or propyl acetate is used, the inventive battery has good low temperature characteristics and stability.

As described above, the lithium secondary battery of the present invention has good capacity, efficiency, high-rate charge/discharge and cycle life characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material for a lithium secondary battery comprising a crystalline carbon core and an amorphous carbon shell formed on the core, wherein the negative active material has an intensity ratio I(110)/(002) of an X-ray diffraction peak intensity I(002) at a (002) plane to an X-ray diffraction peak intensity I(110) at a (110) plane of less than 0.04 and wherein the negative active material has greater than 20 wt % of amorphous carbon based on the total active material.

2. The negative active material of claim 1, wherein the crystalline carbon core has one of a non-uniform, a disk shaped, and a fibrous form or a mixture thereof and a plane distance of $3.35 \leq d_{002} < 3.37$ Å of X-ray plane distance at the (002) plane, and wherein the amorphous carbon shell has the characteristic distance of $d_{002}$ of 3.43–3.8 Å for its X-ray diffraction patterns for the (002) plane.

3. The negative active material of claim 1 wherein the core has the Raman spectrum intensity ratio I(1360)/I(1580) of a Raman spectrum peak intensity I(1580) at a 1360 Å to a Raman spectrum peak intensity I(1360) at a 1360 of less than 0.3, and wherein the shell has the Raman spectrum intensity ratio I(1360)/I(1580) of a Raman spectrum peak intensity I(1580) at a 1360 Å to a Raman spectrum peak intensity I(1360) at a 1360 of more than 0.2.

4. The negative active material of claim 1 wherein the average size of the core is 0.1 to 30 μm.

5. A negative active material for a lithium secondary battery comprising secondary particles having substantially spherical form, the secondary particles being prepared by randomly agglomerating at least one crystalline carbon primary particle and having an amorphous carbon as the binding agent of the primary particles, wherein the negative active material has an intensity ratio I(110)/(002) of an X-ray diffraction peak intensity I(002) at a (002) plane to an X-ray diffraction peak intensity I(110) at a (110) plane of less than 0.04 and wherein the negative active material has greater than 20 wt % of amorphous carbon based on the total active material.

6. The negative active material of claim 5, wherein the secondary particle has an average particle diameter of 5 to 100 μm and a specific surface area of 0.5 to 4 m²/g.

7. The negative active material of claim 5, wherein the crystalline carbon comprises one of a flaky, a spherical, and a fibrous form or mixture thereof, wherein the carbon has crystalline-plane-layer distance of $3.37 < d_{002} \leq 3.4$ Å of X-ray diffraction plane distance at the (002) plane, and wherein the amorphous carbon shell has a plane distance of $d_{002}$ of 3.43–3.8 Å for its X-ray diffraction patterns for the (002) plane.

8. The negative active material of claim 5 wherein the crystalline carbon has the Raman spectrum intensity ratio I(1360)/I(1580) of a Raman spectrum peak intensity I(1580) at a 1360 Å to a Raman spectrum peak intensity I(1360) at a 1360 of less than 0.3, and wherein the amorphous carbon has the Raman spectrum intensity ratio I(1360)/I(1580) of a Raman spectrum peak intensity I(1580) at a 1360 Å to a Raman spectrum peak intensity I(1360) at a 1360 of more than 0.2.

9. A negative active material for a lithium secondary battery having at least two exothermic peaks at a temperature of 1000° C. or less, the negative active material including a crystalline carbon and an amorphous carbon and wherein the negative active material has greater than 20 wt % of amorphous carbon based on the total active material.

10. The negative active material of claim 9 wherein the negative active material has at least two exothermic peaks which are overlapped to form a shoulder.

11. A lithium electrode comprising:
    a positive electrode comprising a positive active material;
    a negative electrode comprising a negative active material composite having at least two exothermic peaks, the active material including a crystalline carbon and an amorphous carbon, with the at least two exothermic peaks overlapping at a temperature of 1000° C. or less and wherein the negative active material has greater than 20 wt % of amorphous carbon based on the total active material;
    a separator interposed between the positive and the negative electrodes; and
    an electrolyte in which the positive and negative electrodes and the separator are immersed, comprising an organic solvent and a lithium salt.

12. The lithium secondary battery of claim 11 wherein the organic solvent comprises:
    at least one of ethylene carbonate, dimethyl carbonate, diethyl carbonate, propylene carbonate, and propyl acetate.

13. The lithium secondary battery of claim 12 wherein the organic solvent comprises ethylene carbonate, dimethyl carbonate and 10–50 volume percent of propylene carbonate.

14. The lithium secondary battery of claim 12 wherein the organic solvent comprises ethylene carbonate, dimethyl carbonate, diethyl carbonate and 5–30 volume percent of propylene carbonate.

15. The lithium secondary battery of claim 12 wherein the organic solvent comprises ethylene carbonate, diethyl carbonate and 5–50 volume percent of propyl acetate.

16. The lithium secondary battery of clam 12 wherein the organic solvent has at least 51 volume percent of cyclic carbonate and chain carbonate.

17. The lithium secondary battery of claim 16 wherein the cyclic carbonate is selected from the group consisting of ethylene carbonate, propylene carbonate and the mixture thereof.

18. The lithium secondary battery of claim 16 wherein the chain carbonate is selected from the group consisting of dimethyl carbonate, ethyl methyl carbonate, diethyl carbonate and mixture thereof.

19. The lithium secondary battery of claim 12 wherein the negative active material comprises a crystalline carbon core and an amorphous carbon shell formed on the core.

20. The lithium secondary battery of claim 12, wherein the negative active material comprises secondary particles on which an amorphous carbon is formed, the secondary particles being prepared by randomly agglomerating at least one crystalline carbon primary particle.

21. The lithium secondary battery of claim 12 wherein the positive active material comprises $LiMN_2$ (M is Co, Ni, Mn or mixture thereof and N is O, S, F and mixture thereof), $LiMn_2O_4$, $LiCoO_2$, $LiNiO_2$, $LiMn_2O_4$, $LiNi_xCo_{1-x}O_y$ ($0<x<1$, $0<y\leq 2$).

* * * * *